Nov. 19, 1940. S. W. KEYS 2,221,802
PROCESS OF MILLING WHEAT
Filed Sept. 11, 1937
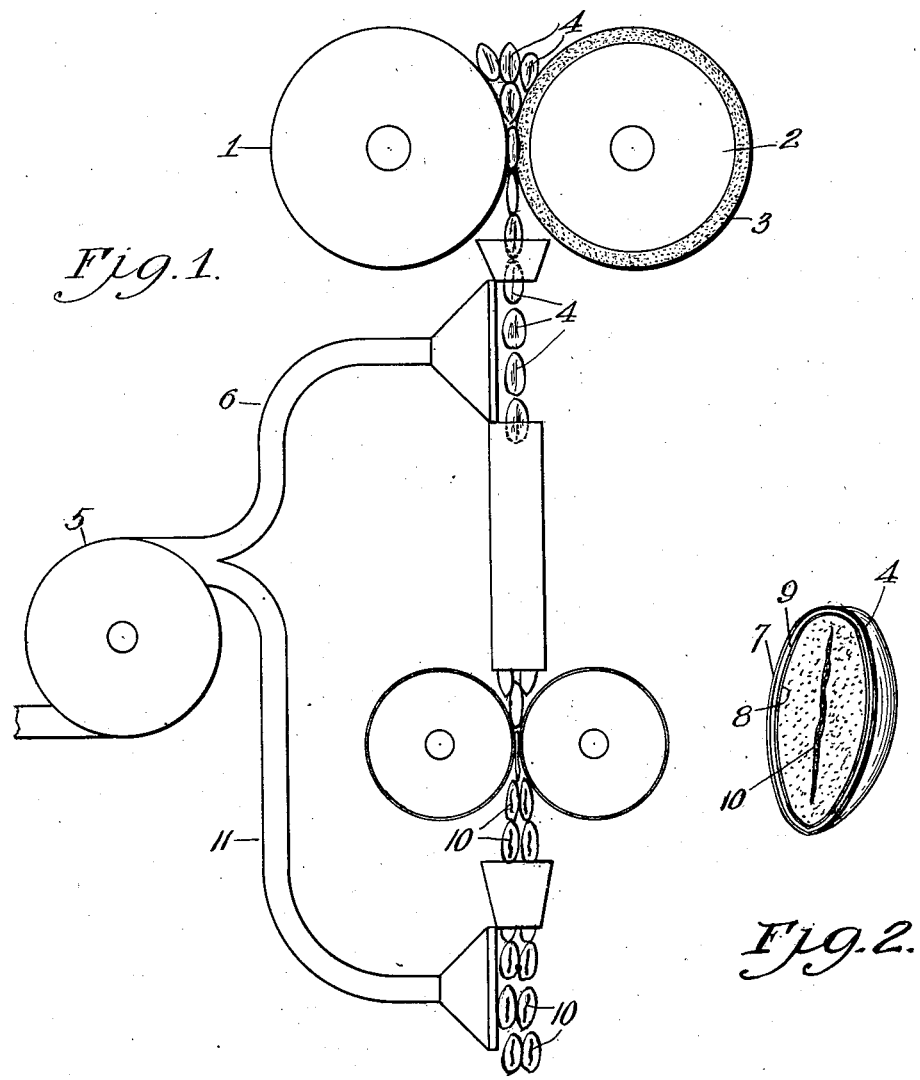
Inventor
Samuel W. Keys
By Thorpe & Thorpe
Attorneys Patented Nov. 19, 1940

2,221,802

UNITED STATES PATENT OFFICE 2,221,802

PROCESS OF MILLING WHEAT

Samuel W. Keys, Platte City, Mo.

Application September 11, 1937, Serial No. 163,426

2 Claims. (Cl. 83—42)

This invention relates to a method of and apparatus for milling flour, and has for its object broadly, to produce a grade of white flour more refined (purified) than so-called "patent flour," this result being attained by the elimination of the dark substance, lying like a core, wholly within the kernels of wheat grain or berries, and indifferently termed "ergot" or "stem" by different authorities, which heretofore remained in admixed relation with and constituted a part of the flour when ready for distribution or marketing, and by a more efficient and thorough withdrawal of crease dirt and a greater proportion of the bran constituent from the naked seed or endosperm, than attainable by conventional milling practice.

After the wheat has been subjected to the customary treatments of separation, tempering and washing or equivalent treatment, its brittleness is reduced to a considerable degree, and I have found by experimental tests that in such condition the grains can be deformed or partially flattened without appreciable fracturing of their relatively hard skins or shells, and without flaking off the coatings of bran although having a tendency to loosen said bran coatings, and the oily or gummy germ ends of the grains, and I have also found that after the grains are deformed, dirt bedded in the external creases of the grains so firmly as to resist ready dislocation before deformation, can, after deformation, be eliminated by a relatively light blast or suction of air, this being true because deformation loosens the dirt and in general spreads or widens the creases.

Furthermore the deforming action tends to loosen the bond between the kernel and the bran forming an inner layer or lining of the skin or shell, and also effects loosening or pulverization of the so-called ergot or "stem" of the wheat, one of the causes of imparting a gray color to the flour. All of the treatments described make for more efficiency and thoroughness in the first bolting treatment to separate practically all of the bran and skin or shell from that portion of the kernel reduced enough to escape under said bolting treatment.

More specifically my object is to first effect deformation, without appreciable splitting or grinding, of the wheat grains or berries while in transit during the milling operation, for two purposes, one to facilitate the removal of the so-called crease dirt, as explained, and the other, to loosen the adhesion of and partially crush the kernel within the skin or shell of the grain, reduce the dark substance called ergot or stem found within the kernel to a powdery condition, and more or less disturb or loosen but not flake off the exterior coating of bran from the skin or shell of the wheat berry. The second purpose, following the removal of the crease dirt, is to utilize a set of conventional coarse-cut breaker rolls to cut or split the grains in a generally longitudinal direction to further loosen or weaken the adhesion of the endosperm to the inner layer or lining of bran and partially flake the latter and the exterior coating of bran from the skin, and incidentally expose the previously powdered dark "stem" or core mentioned. A further object is to subject the split or cut grains to the action of an air blast or suction of insufficient force to disturb the loose fragments of bran and of the kernel and shell, but of enough power to carry off the crushed or powdered dark substance heretofore unextracted, and constituting but an infinitesimal constituent of the flour product, having no food value, but rather, according to some experts or authorities, a degrading or deleterious effect on the flour because exuding an odor more or less offensive and giving a grayish tint to the flour.

The treatments described are followed by the customary milling operations, briefly indicated to a limited extent as follows, that is to say after the set of coarse-cut breaker rolls have functioned and after the said objectionable dark substance has been withdrawn, the action is a customary bolting treatment to withdraw most of that part of the kernel and endosperm so far reduced to powdered form. The coarse particles remaining, including the bran, are conveyed as usual to a second but finer cut set of breaker rolls to effect a finer reduction or comminution and an appreciable flaking of bran from the pieces of skin or shell. Following this second breaker-roll action, the comminuted material is subjected to a bolting operation to withdraw that portion or most of the kernel and endosperm reduced to powdered form by the second grinding operation, the remaining portions of kernel and endosperm too coarse for such withdrawal passing with the ground shell and bran to a third set of breaker rolls for further reduction treatment, and this reduction is followed by another bolting action, the coarser parts being then subjected to another reduction by very finely cut breaker rolls, this action being followed by another bolting treatment, and by further breaker roll and bolting treatments, if needed, though it is estimated that by the deformation treatment to loosen the kernel and endosperm and partially loosen the bran, prior to actual grinding by the first set of breaker rolls, treatment by three or four sets of breaker rolls with a bolting operation after each grinding reduction, practically all of the kernel and endosperm to constitute the basis of flour of highest quality, can be withdrawn.

The treatments of the flour constituents and the separate treatment of the bran subsequent to the course of operations described are conventional, but as such treatments, like the elimination of the oily germ ends, form no part of my invention, they are neither described nor illustrated, the primary novel feature, as indicated, being to facilitate the separation of the white flour constituents from the bran and skin or shell, and to provide means for disposing of the objectional dark substance on the passage of the split grain from the first set of breaker rolls to and before the grain is subjected to the first bolting operation or treatment. A secondary object is by deforming or partial flattening of the grains, to partly open or widen the longitudinal creases thereof, and thus provide for the discharge of the dirt bedded in such creases so firmly as to escape dislodgment during the preparatory treatments of milling separation, washing, tempering and scouring of the wheat.

With the objects mentioned in view, the invention consists in the novel method and organization of appliances for producing white flour of high quality, and in order that it may be fully understood, reference is to be had to the following description and claims, and to the accompanying drawing, in which Figure 1 is a diagrammatic view of apparatus arranged to perform a series of operations or novel steps embodying the invention. Figure 2 is an enlarged longitudinal section of a grain of wheat, to disclose the stem or core of the grain.

Referring to the drawing in detail, 1 and 2 indicate means for deforming, by partial flattening, the grains of a stream of wheat, the means disclosed being a pair of driven rolls, bearing a yielding surface relationship, preferably by the equipment of at least one of the rolls with a firm and relatively hard surface, preferably of vulcanized rubber or the like, as at 3, the mechanism for revolving the rolls being of any conventional character and hence not shown.

The rolls are so disposed that wheat fed to them is subjected to a pressure by the rolls sufficient to partially deform or flatten the grains, substantially as depicted in the drawing, the deformation treatment having as one objective, as hereinbefore explained, the widening or spreading of the external longitudinal creases 4, found in all wheat grains or berries, and wherein dirt is sometimes so bedded, that it is not dislodged until it passes through the first set of breaker rolls and hence mixed with and becomes a deleterious part of white flour product and perhaps also of the bran product.

As the deformed grains pass from the deforming rolls or the equivalent thereof, they are subjected to either a light blast or suction of air from a fan or blower 5 or the like the force of the blast or suction effecting the discharge or withdrawal of such dirt, through a conduit 6, which discharges it as waste at such point that it cannot follow the stream of wheat.

The deforming operation tends to loosen but not scale off the external coating 7 of bran on the grains, and also to apply such pressure on the latter as to break, to some degree at least, the adhesion between the bran linings 8 of the hard skins or shells 9 of the grains and the endosperm and kernel constituents, and also to crush or reduce to powdery form the darkly colored substance 10 of the grains, which as heretofore explained, become a part of the flour under conventional milling practice, and which has a deleterious effect on the quality of the flour.

To effect discharge of the said dark substances, which are of such character, that relatively light compression of the grains reduces or pulverizes them, the stream of split or coarsely ground wheat is subjected to a light blast or suctional action, which may be by a branch conduit 11 leading to that of the fan or blower mentioned. The split wheat is now subjected to treatment by a gyratory or other type of bolter, whereby the fine parts of the kernel and endosperm, are sifted from the coarse parts thereof and the pieces of shell and flaked-off parts of the bran, the latter with said coarser parts then being conveyed in the conventional manner of milling practice as explained, to a second set of breaker rolls, where the stock is further reduced. It is then again subjected to bolting treatment, followed by one or more reducing treatments by breaker rolls and following bolting treatments, which being repetitions of those described require no further reference, as all operations subsequent to the discharge from the split grains, of the said dark substance, are in no wise different from the common practice of all high grade milling.

From the above description it will be evident that I have produced a process possessing all of the features of advantage set forth as desirable, and while I have described and illustrated the preferred mode of operation, it is to be understood that I reserve the right to all changes within the spirit of the invention and without the ambit of the prior art.

I claim:

1. The method of processing a wheat berry precedent to the manufacture of flour which comprises; moisture-tempering the wheat berry to reduce its brittleness; and subjecting the berry to the pressure of relatively yielding surface elements having such resilience as compared to the moisture-tempered berry that the berry is substantially enveloped, and the outer hull is deformed without being appreciably split, whereby the ergot is loosened and reduced, the hull is frictionally cleaned, and adhesion between the hull and the endosperm is simultaneously loosened.

2. The method of separating ergot from a wheat berry precedent to the manufacture of flour which comprises; moisture-tempering the wheat berry sufficiently to reduce its brittleness; subjecting the berry to the pressure of relatively yielding surface elements having such resilience as compared to the moisture-tempered berry that the berry is substantially enveloped, and the outer hull is deformed without being appreciably split, whereby the ergot is loosened and reduced, the hull is frictionally cleaned, and adhesion between the hull and endosperm is simultaneously loosened; subjecting the deformed wheat berry to a grinding operation to coarsely break the berry; and separating the ergot from the coarsely ground berry by pneumatic means.

SAMUEL W. KEYS.